United States Patent [19]

Blanchard

[11] Patent Number: 5,793,431
[45] Date of Patent: Aug. 11, 1998

[54] AUDIO/VIDEO DISCREPANCY MANAGEMENT

[75] Inventor: Simon Blanchard, Horley, England

[73] Assignee: U.S. Philips Corporation, New York, N.Y.

[21] Appl. No.: 563,471

[22] Filed: Nov. 28, 1995

[30] Foreign Application Priority Data

Dec. 2, 1994 [GB] United Kingdom ............... 9424429

[51] Int. Cl.$^6$ ............... H04N 7/12; H04N 11/12; H04N 11/04; H04N 9/74
[52] U.S. Cl. ............... 348/423; 348/584; 348/598; 375/372
[58] Field of Search ............... 348/423, 419, 348/384, 390, 500, 584, 598, 599, 720, 722; 375/372

[56] References Cited

U.S. PATENT DOCUMENTS

| | | | |
|---|---|---|---|
| 5,534,929 | 7/1996 | Tanaka | 348/423 |
| 5,534,944 | 7/1996 | Egawa et al. | 348/584 |
| 5,561,466 | 10/1996 | Kiriyama | 348/423 |
| 5,565,923 | 10/1996 | Zdepski | 348/423 |

*Primary Examiner*—Tommy P. Chin
*Assistant Examiner*—Nhon T. Diep
*Attorney, Agent, or Firm*—Laurie E. Gathman

[57] ABSTRACT

A method is provided for encoding of digital video signal segments which are interleaved to form a single system stream (video STD plus audio STD). In order to enable seamless joining of the segments, control of the video system layer buffer loading is related to the loading of the video layer buffer (VBV occupancy). Starting from an idealised match at the point the first picture is to be read out of the decoder buffer, the point at which the first picture is to be read out of the system layer buffer is adjusted by an amount determined by the predicted duration of the segment and the point at which the last frame of the segment is due to be read out. The adjustment prevents possible overlap of segment timing values derived initially from the idealised match case. The technique has particular application to interactive multimedia applications where real time splicing of video clips is required with minimal visual discontinuity.

9 Claims, 7 Drawing Sheets

AUDIO/VIDEO DISCREPANCY MANAGEMENT

BACKGROUND OF THE INVENTION

The present invention relates to the encoding of audio and video signals and in particular to producing segments of audio and video material that can be joined together on the fly.

It is typically the case that, when two video clips are required to be played one after the other, the decoder is required to reset itself to a starting state before decoding the second clip. During this reset, the user will be presented with the last frame of the first clip frozen on the screen, together with a mute of the accompanying audio. Depending on the duration of the freeze/mute, this discontinuity can be intrusive to the user.

What is required is a seamless join in which the transition between the end of one clip and the start of the next is not noticeable to the decoder. This implies that from the user's point of view there is no perceptible change in the viewed frame rate and the audio continues uninterrupted. Applications for seamless video are numerous. An example from a CD-i perspective is the use of photo-real backgrounds for computer generated characters; an example use of this technique would be animated character running in front of an MPEG coded video sequence. Another is a series of character-user interactions such as interactive movies where the viewer has the chance to influence development of the storyline by selecting from available alternative scenarios. Branch points along the path a user chooses to take through an interactive movie should appear seamless, otherwise the user will lose the suspension of disbelief normally associated with watching a movie.

A method for encoding segments of video such that re-initialisation of the decoder is not required is described in our pending United Kingdom patent application number 9424436.5 (PHB 33950) entitled "Video Editing Buffer Management" filed 2nd Dec., 1994. The method uses targeting of decoder buffer levels to give consistency of decoder buffer occupancy for the end of each video clip and predictability for the start of each segment such as to allow successive clips to be joined directly without risking overflow or underflow in the decoder buffer.

The above method, whilst suitable for sequences of video frames, takes no account of the other information that will typically accompany such a sequence—for example an audio soundtrack. The video will generally be interleaved with other information into a single stream, referred to as the system stream, which constitutes the data that will be presented to a decoder/display device (for example the data stream read from a compact disc or delivered via a cable network). A problem occurs with trying to form interleaved segments which can seamlessly be joined in that the time taken to deliver the video will generally not be equal to that for the audio. In trying to predict the instant at which a following clip should start, this timing disparity can generate error conditions such as indicating that decoding of a following clip should commence prior to completing the decoding of the present clip.

SUMMARY OF THE INVENTION

It is therefore an object of the present invention to provide for seamless joining of system stream segments whilst avoiding such timing overlaps and also avoiding overflow or underflow in the decoders buffer.

In accordance with the present invention there is provided a method for encoding of digital video signals, in the form of segments each comprising two or more video frames, and in an encoder apparatus having a coding stage, an encoder buffer, and means for interleaving the encoded video signal with at least one further signal to form a system stream, the method comprising, for each segment, the steps of: successively encoding the frames of the segment according to a predetermined coding scheme; reading the encoded frames into the buffer; reading the encoded segment out of the buffer at a substantially constant bit rate; and interleaving the buffer output signal into a system stream together with one or more time stamps;

characterised in that the encoder buffer occupancy is controlled to have a first predetermined level at the moment the last frame of a preceding segment has been read into it, which occupancy level is related to a decoder buffer occupancy level, and in that the method comprises the further steps of:

deriving the time t required to fill a decoder buffer from empty to the said decoder buffer occupancy level at the constant bit rate;

predicting a duration delta for a current segment;

predicting a time value for the point at which the last frame of the current segment is to be read out of the decoder buffer;

reducing the value of t until the time value given by (t+delta) is close to but greater than the said time value at which the last frame of the current segment is to be read out of the decoder buffer; and inserting a time stamp into the system stream of the segment indicating that the first frame of that segment is to be read out of the decoder buffer at the time given by the reduced value of t after loading of the segment commenced.

The time value for the point at which the last frame of the current segment is to be read out of the decoder buffer may be predicted by calculating the duration of the segment and subtracting from that the decoder buffer maximum capacity in terms of time. Preferably, that time value (for the point at which the last frame of the current segment is to be read out of the decoder buffer) is predicted for each of the different streams interleaved, with the greatest value used in the derivation of the reduced value of t for all streams.

In order to guard against an unlikely, but theoretically possible, underflow condition (as will be described hereinafter) the encoder may limit the size of the encoded frames until a predetermined decoder buffer occupancy level is reached.

As will be demonstrated hereinafter, the derivation of the instant at which a decoder should start to decode a received segment enables smooth joining of segments at the system stream level, and by adjusting this start time in dependence on the stream length, the potential overlap problem mentioned above is avoided. Also, as the decoder buffer target level is a calculated level based on the encoder buffer contents, the conventional technique of having to fill the decoder buffer as full as possible before starting to decode is avoided.

Preferably, a common decoder buffer level (and hence initial value of t—the first time stamp positioning) is provided. This may be achieved by setting a target number of bits used to encode pictures of the first segment and controllably varying the bit allocation per picture during encoding such as to reach the said encoder buffer occupancy level at the end of the segment.

As will be described, in order to define the decoder buffer level, a maximum encoder buffer occupancy level is preferably specified, with the decoder buffer occupancy level being defined as the difference between the encoders maximum level and the encoder buffer occupancy level one frame period after the last picture of the first segment has been read into the encoder buffer.

The present invention also provides a digital video signal encoder apparatus, configured for the encoding of image segments, where each segment comprises two or more video frames, the apparatus comprising: an encoding stage arranged to receive successive frames of a segment and encode them according to a predetermined coding scheme; a buffer coupled to receive successive encoded frames from the encoding stage and arranged to output encoded segments at a substantially constant bit rate; and a multiplexer coupled to receive the buffer output and at least one further signal and arranged to interleave them into a system stream; characterised in that the encoding stage is operable to encode images of a segment in a controllably variable number of bits, such as to produce a predetermined encoder buffer occupancy at the moment the last image of a segment is read into the encoder buffer, to generate predicted values for the segment duration and time value for the point at which the last frame of the segment is to be read out of a decoder buffer, and to determine a time value on the basis thereof, and said multiplexer is arranged to insert a time stamp into the system stream of the segment indicating that the first frame of that segment is to be read out of the decoder buffer said determined time value after loading of the segment into the decoder buffer commenced.

BRIEF DESCRIPTION OF THE DRAWING

Further features and advantages of the present invention will become apparent from reading of the following description and the attached claims, the disclosure of which is incorporated herein by reference.

Preferred embodiments will now be described by way of example only, and with reference to the accompanying drawings in which.

DESCRIPTION OF THE PREFERRED EMBODIMENTS

The following description relates to encoders and decoders operating in accordance with MPEG standards and conventional nomenclature from those standards will be used hereinafter. It will be recognised by the skilled practitioner however, that use of the present invention is not constrained to the MPEG standard.

Any coding standard must be developed with models of how the encoder and decoder interface to one another. As an encoder runs it has to model what will happen in the decoder such that it never sends the decoder into an illegal state. Similarly, the decoder must support the same model the encoder used so that it remains in a legal state and produces the output the encoder intended. MPEG is no exception to this rule.

Initially, it will be useful to consider the production of segments of purely video data which can be seamlessly joined. A preferred method is described in our above-mentioned UK application number 9424436.5 (PHB 33950) and is summarised below with reference to FIG. 1 which shows graphs of buffer occupancy B against time t showing what happens to the encoder and decoder buffer states as one sequence of video frames (pictures) A ends and another B starts. LA indicates the last picture of sequence A; FB indicates the first picture of sequence B. The change of delivery data from sequence A to sequence B is shown by a change in thickness of the buffer occupancy line, with the chain-linked line indicating pictures from sequence A. At some time $t_x$ all the data for sequence A has been delivered and the VBV (Video Buffering Verifier—the MPEG decoder model) has an occupancy of $B_x$ bits. From this time on all the data delivered to the buffer is for sequence B. It will be noted, though, that some pictures from the end of sequence A are still in the buffer, which pictures are all removed by time $t_l$ when the buffer has an occupancy of $B_l$ bits.

The encoder goes through a process known as targeting when it tries to achieve a certain occupancy in the VBV buffer. During targeting the encoder assumes that the VBV buffer has a certain target occupancy when the first picture it has coded is put into the buffer. This places an upper limit on the size of the first picture. At the end of a coding run the encoder targets the VBV occupancy at the point in time just before the first picture for the next sequence would be removed from the buffer, point $B_t$ in FIG. 1. It targets this state by changing the size of the last picture, or last few pictures, as it codes.

Figure 1:
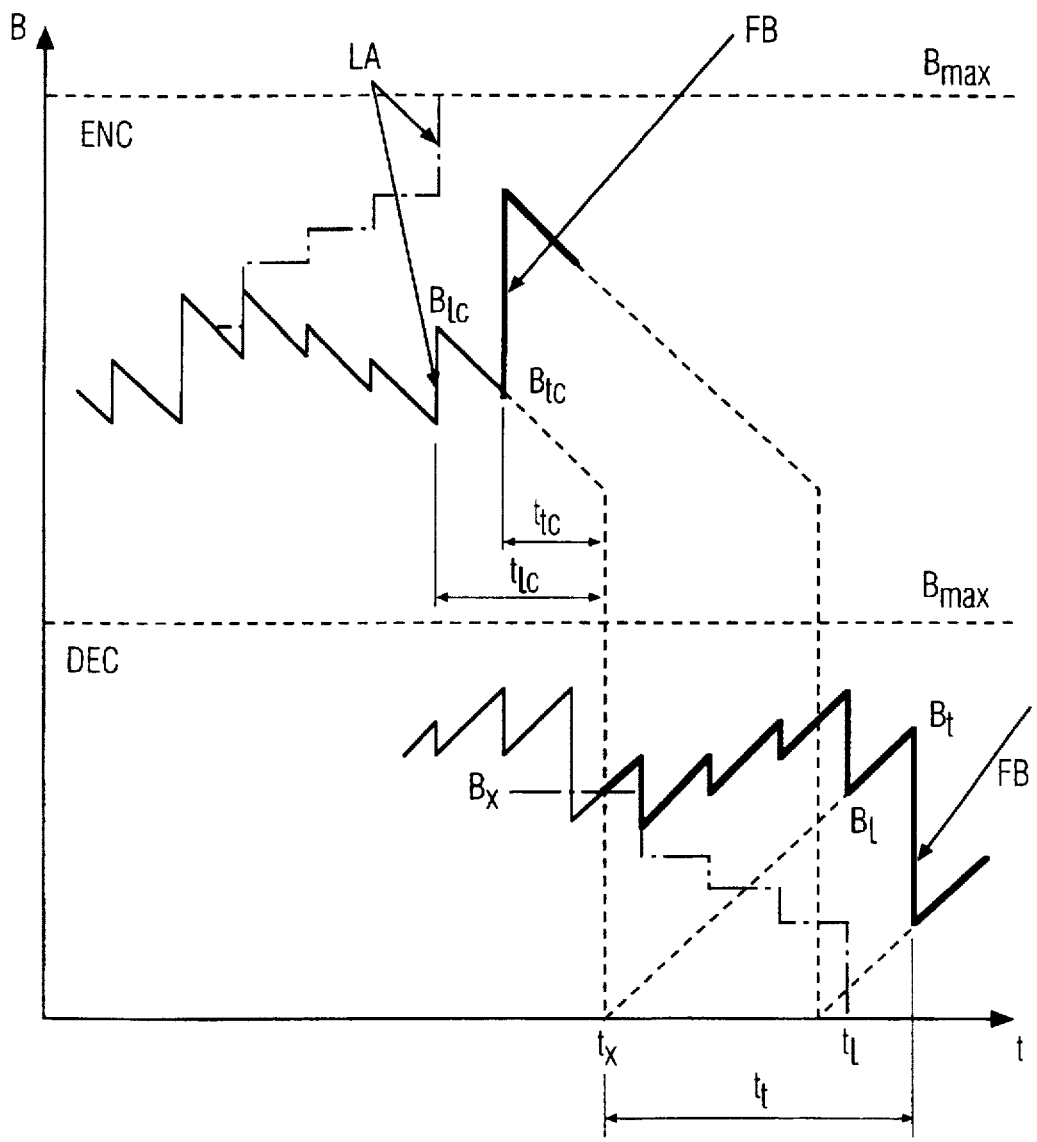
FIG. 1 represents encoder and decoder video buffer contents at the conjunction of two video clips.

In the example shown in FIG. 1 the encoder targets the state $B_t$. This state represents the VBV buffer occupancy at the time just before the first picture of the new sequence is removed. Since, when an encoder runs, it generally has no direct contact with the decoder, it manages picture sizes based on its output buffer rather than transforming to and from the VBV buffer state. Accordingly, the following passages will refer to $B_{tc}$ and $B_{lc}$ (see the encoder occupancy values in the upper portion of FIG. 1).

When targeting a start state the encoder assumes a certain occupancy in its buffer at the point when it introduces the first picture. This buffer occupancy is $B_{tc}$ bits which represents the residual bits from the end of the previous sequence. The presence of these bits limits the maximum size of the first picture to be $B_t$ bits and continues to have an effect on future picture sizes until all the bits have been removed after time $t_{tc}$.

From the encoder's point of view start state targeting is very simple since all that is required is for it to set its initial occupancy to $B_{tc}$ bits rather than the usual start state of being empty.

When the encoder approaches the end of a sequence it tries to target the point $B_{lc}$ by forcing the size of the last picture to be such that when put into the buffer the occupancy will increase to $B_{lc}$ bits. It could produce a very poor quality picture if a large degree of size fixing were applied to the last picture only. To overcome this, the encoder preferably has a target number of bits for the last GOP (Group of Pictures) and a target number of bits for each of the K pictures within the GOP, thus allowing the encoder to gradually approach the correct state.

Turning now to the system layer, this is produced when multiplexers combine video, audio and other elementary streams into one system stream. The system stream contains interleaved elementary streams and timing information in the form of System Clock References (SCRs), Presentation Time Stamps (PTSs) and Decoding Time Stamps (DTSs).

The multiplexer's job is to ensure that data is delivered from a system stream into the decoder's buffers fast enough so that they never completely empty and slow enough so that they never overflow. The MPEG standard defines a buffer called the System Target Decoder (STD) that is used to model the transfer of data from the Digital Storage Medium (DSM) into the decoder. The purpose of this buffer is to mask the fact that, because of data interleaving, delivery into a decoder is in bursts but the decoder performance model assumes a constant bit rate. The usual strategy for multiplexing video and audio streams typically starts by filling the STD buffer as full as possible. The SCR of the last pack made is then set so that the first picture is removed from the buffer at this time. Next, the SCRs of the previous packs are set to the correct values because they arrive ahead of this pack in time. Finally, the buffer is maintained as full as possible until all the data from the elementary stream has been consumed.

The multiplexer operation is somewhat more complex than this because the multiplexer has to juggle with multiple streams. Also a multiplexer has to support any additional features that are needed to meet the specification of a system stream as it has been defined for the target platform.

Figure 2:
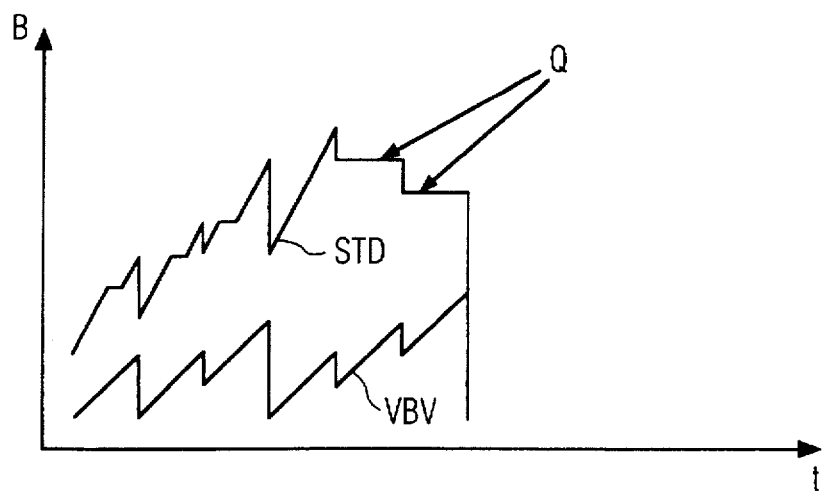
FIG. 2 represents the relationship between decoder video and system buffer occupancies.

The STD buffer can be thought of as enclosing the VBV buffer as shown in FIG. 2. The Figure represents a simplified view of the STD and VBV relationship. In FIG. 2 the STD buffer occupancy (thick line) is shown enclosing the VBV buffer. A point to note is that the slope of the STD buffer line is higher than that of the VBV line. This is because the bit rate of the DSM is higher than the coded video bit rate. It can also be seen that at times (indicated by reference Q), no data is delivered to the STD. This happens because either the bandwidth of the DSM is taken up by other elementary streams or the multiplexer has decided not to deliver data to the STD because of buffer management issues.

Figure 3:
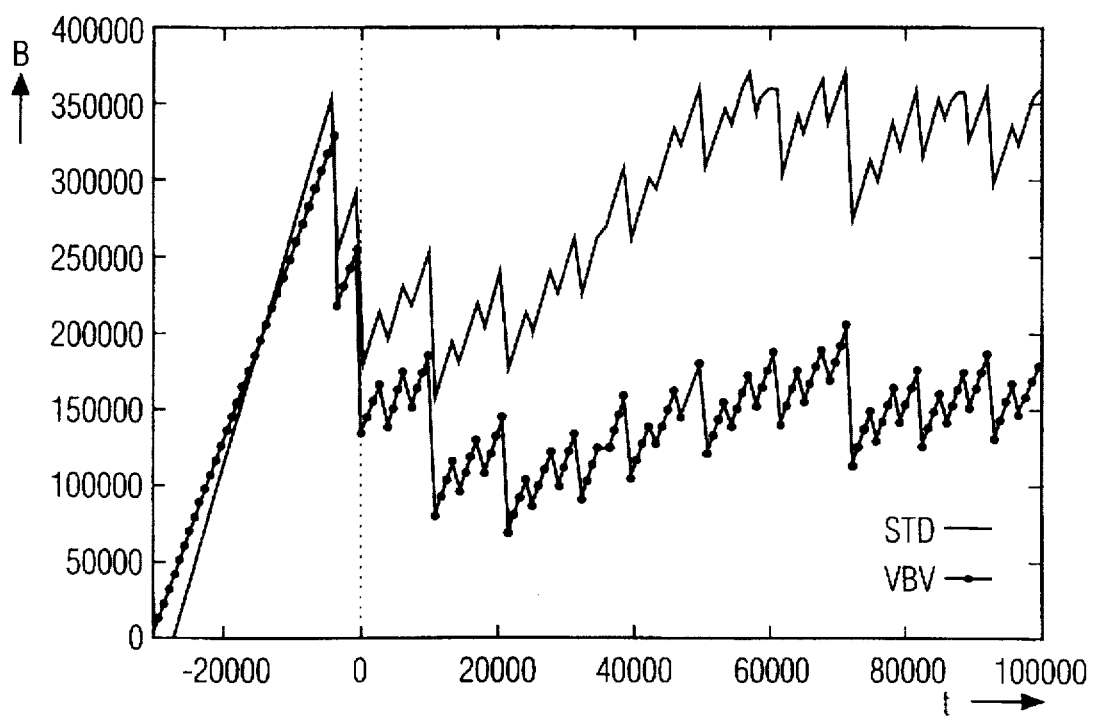
FIGS. 3 to 5 represent decoder video and system buffer contents in a conventional system, and at the start and finish of a targeted clip, respectively.

FIG. 3 shows graphs of what happens to the VBV and STD occupancy at the start of a decoding a normal, i.e not targeted, stream. In the graph, for ease of understanding, the times (in terms of system ticks) at which pictures are removed from the two buffers are shown as in synchronism with each other. The VBV has no concept of data delivery start time, only of picture removal time based on the VBV delay. In order for the graphs to line up, a constant offset was applied to the VBV sample times in the Figure.

In FIG. 3 it can be seen that the multiplexer and the encoder have followed a similar strategy at the start of clip. That is to say, their buffers have been filled up as much as possible before the first picture is removed, as described above. Also it can be seen that, in this case, the STD buffer occupancy line always contains the VBV occupancy. The exception to this rule is during start-up because the data rate of the DSM is higher than that of the VBV so delivery to the STD starts after the VBV.

Turning now to the production of system streams that can be concatenated together, the production of seamless system streams containing video will first be considered. Referring back to FIG. 1, it will be seen that the time taken for all the bits from the end of sequence A to be removed is dependent on how many pictures are in the buffer at the time when data delivery for sequence A stops. This time is dependent on the source material and the encoder used. Accordingly, the buffer occupancy $B_x$ at time $t_x$ will vary from clip to clip. Therefore there is no way the multiplexer can calculate what $t_x$ and $B_x$ would be for the general case based on the knowledge that is usually available to it. ie. bit rate, frame rate and what $B_f$ was.

To avoid the problem of all the unknowns described above, we use the fact that the data in the buffer when delivery of sequence A stops is sufficient to cover the time it will take for constant rate delivery to deliver $B_f$ bits. We have recognised that this allows the setting of a maximum time for delivery of $B_f$ bits at the start of the multiplexed stream as:

$$t_f = \frac{B_f}{R} \quad (1)$$

where $t_f$ is as shown in FIG. 1, and R is the delivery rate.

This time is important to the multiplexer because it allows the setting of the SCR time at this point, since this is the point when the first picture should be removed from the STD buffer. Therefore, the multiplexer is set to fill the STD buffer to at least $B_f$ bits and set the SCRs so that at this time the first picture is removed. Note that this contrasts the conventional technique in which the buffer is filled as much as possible at which point the first picture is removed.

It should be pointed out here that the STD buffer is bigger than the VBV buffer. In the constrained system parameters (CSPS) case the STD buffer can be up to 46 kbytes compared to a maximum VBV size of 40 kbytes. This extra space allows the multiplexer to interleave different elementary streams into one system stream hiding the sporadic delivery to the decoder.

Figure 4:
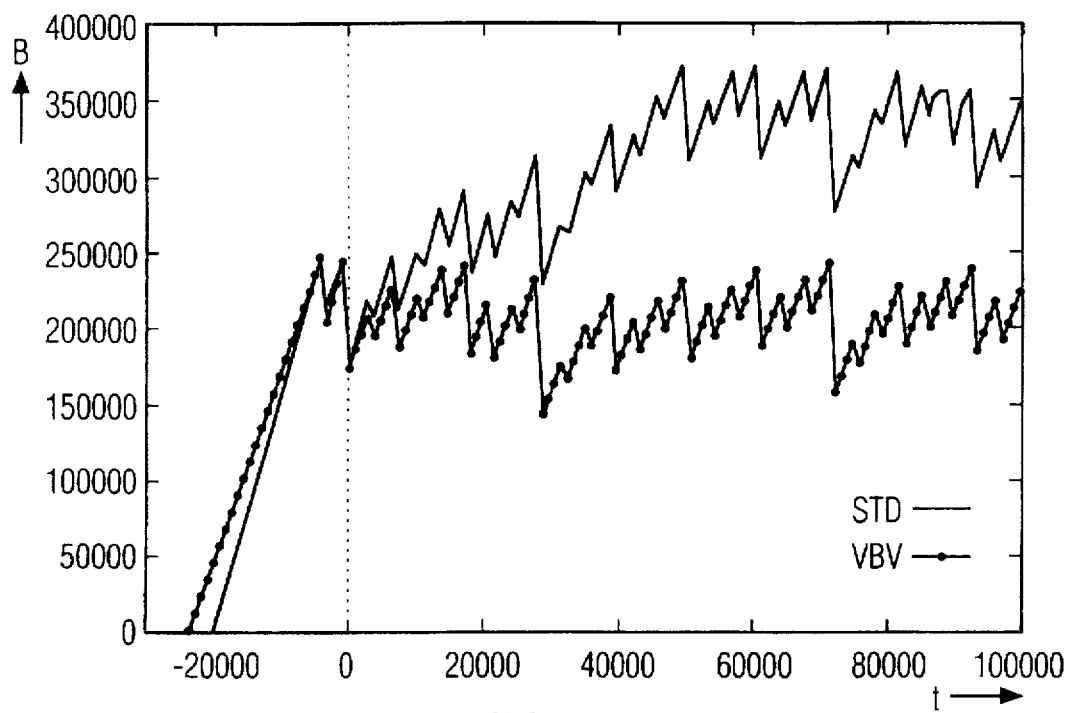

FIG. 4 shows graphs of what happens in the VBV and STD buffer at the start of a targeted multiplexing operation. As with FIG. 3, the graph shows occupancy B (bits) against time t (system ticks). It will be noted that the occupancy of the VBV and STD buffers is the same at the point when the first picture is removed from the buffer. From that point on the occupancy of the STD buffer starts to overtake that of the VBV buffer because the data delivery rate is higher.

The multiplexer has far less control over the end state of the STD buffer. The end state is dependent on the size of the pictures still in the buffer which is controlled by the encoder. Preferably, the multiplexer attempts to deliver the data to the STD as soon as possible to guard against a problem known as SCR overlap, where data becomes due for a following clip when not all the data from the first clip has been delivered. A suggested multiplexer strategy for this is to make a data packet whenever the STD buffer can accept data no matter how small.

Figure 5:
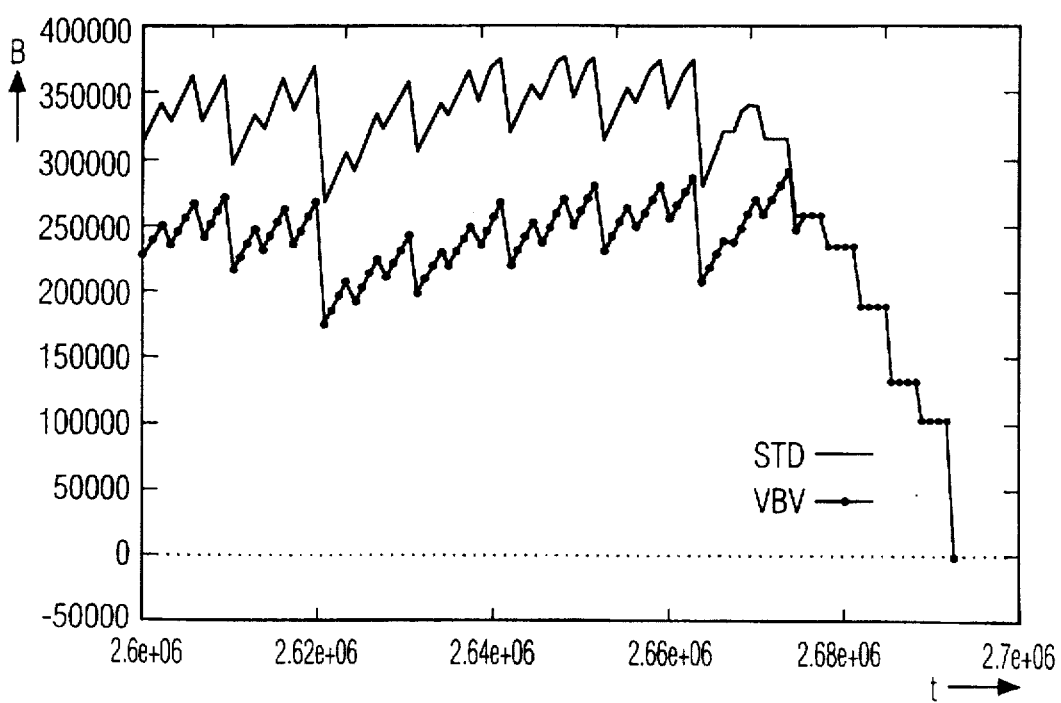

FIG. 5 shows graphs of the VBV and STD states at the end of a clip. It can be seen that delivery of data to the STD stops before the VBV because the STD buffer is larger and the received bit rate is higher. Towards the end of the clip the two graphs re-converge. This is the point in time when data delivery to both buffers has stopped and they contain only the pictures that make up the end of the clip. The time taken for these end pictures to be removed from the buffers is the time available for filling up the buffers with data from the next clip before the first picture of that clip is removed. This fill time is shown as time $t_f$ in FIG. 1.

Turning now to audio signals, there is no equivalent of the VBV buffer for audio which makes the production of seamless audio much simpler than for video. The reason for this is because audio is coded at a constant instantaneous bit rate: in other words, all similarly coded audio frames are the same size, to within one byte, whereas video frames vary in size depending on the frame type and complexity. It is, however, possible for the multiplexer to target an STD buffer state at the time when the first audio frame is removed in a similar way to that of video.

Figure 6:
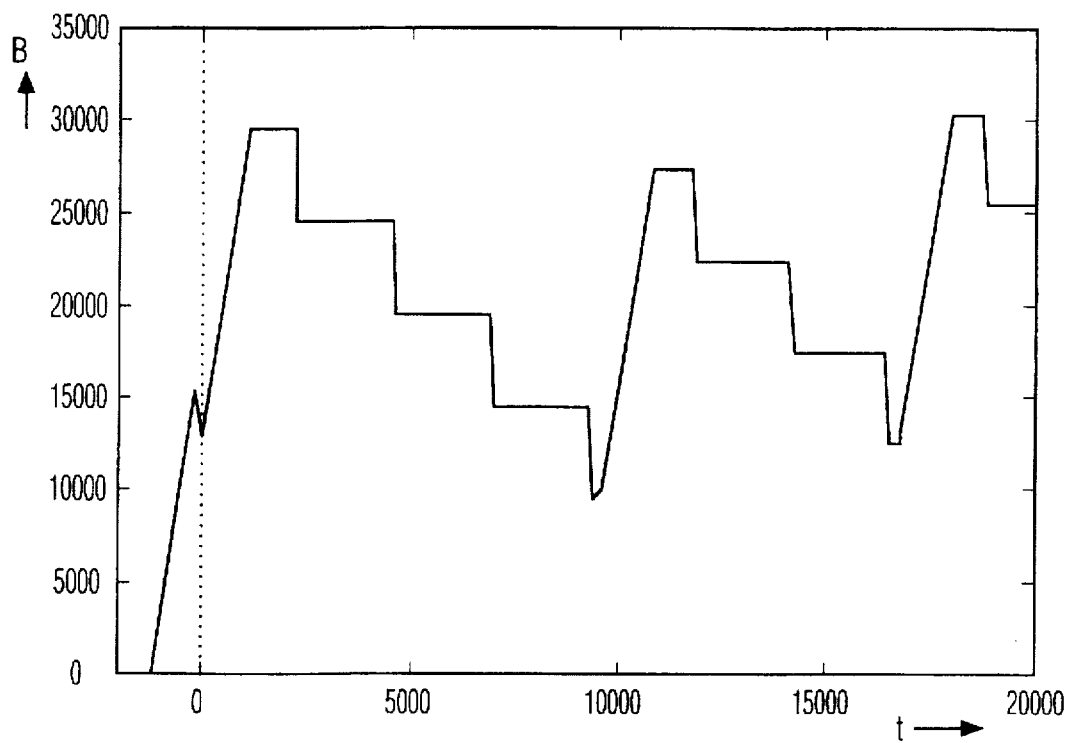
FIGS. 6 and 7 represent audio buffer contents at the start and finish of a targeted audio clip, respectively.

FIG. 6 shows a graph of the start of a targeted audio multiplexing operation. In this case the multiplexer targets the STD state at 2048 bytes (16384 bits) at the time when the first audio frame is removed. The fill time is analogous to $t_f$ in FIG. 1 and has the similar property that the time must not be greater than the time represented by the audio frames in the buffer when data delivery stops. When the multiplexer has reached its target and the first audio frame has been removed it follows the strategy of keeping the STD buffer as full as possible. The large increasing slopes of the graph represent the delivery of an audio packet. In this case an audio packet is about 2 kbytes big because it was multiplexed for CD-i play-back with a CD-i sector about 2 kbytes big.

Figure 7:
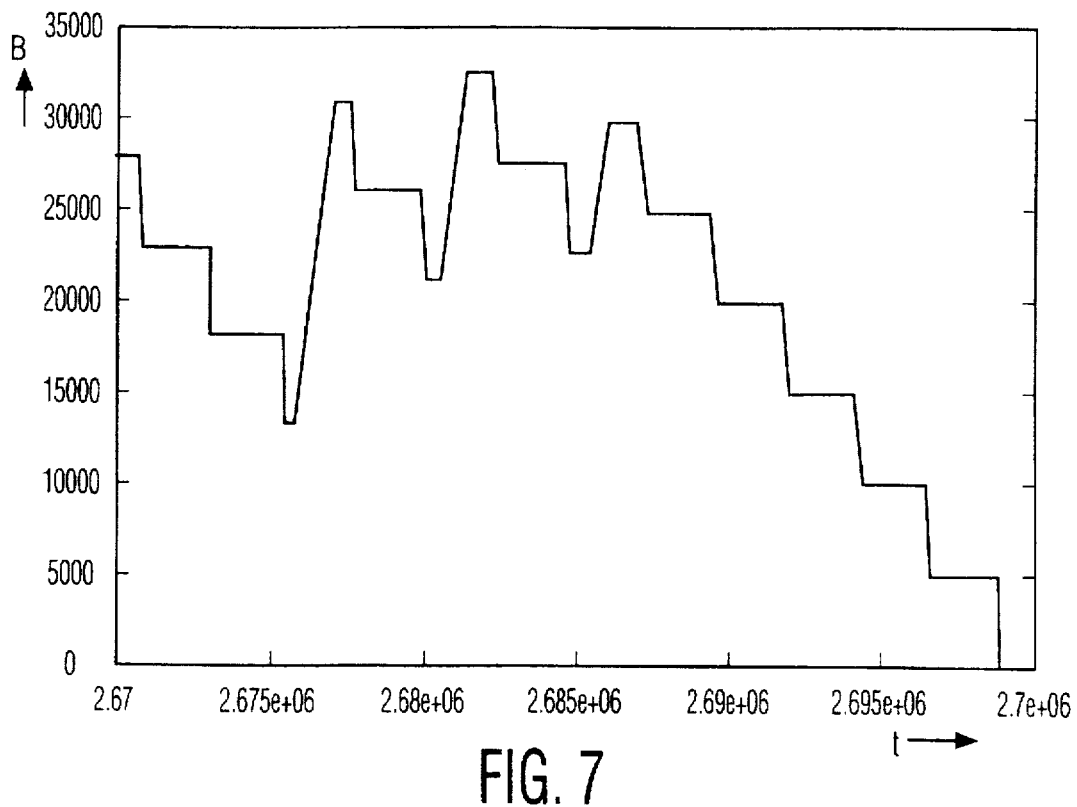

FIG. 7 shows a graph of what happens in the STD at the end of an audio clip. The regular stepping down of occupancy representing the audio frames in the buffer begins at the time when data delivery stops. These residual audio frames will mask the change over from the end of one audio clip to the next. They last a finite time depending on the number of frames but as can be seen by referring to FIG. 6, the time to fill the STD buffer to its target is so short compared to the time masked by the residual frames that STD underflow should not occur, assuming that the DSM bit rate is substantially higher than the audio bit rate. Our experiments have shown that, for audio, targeting the STD buffer at about 50% fullness gives acceptable results.

Figure 8:
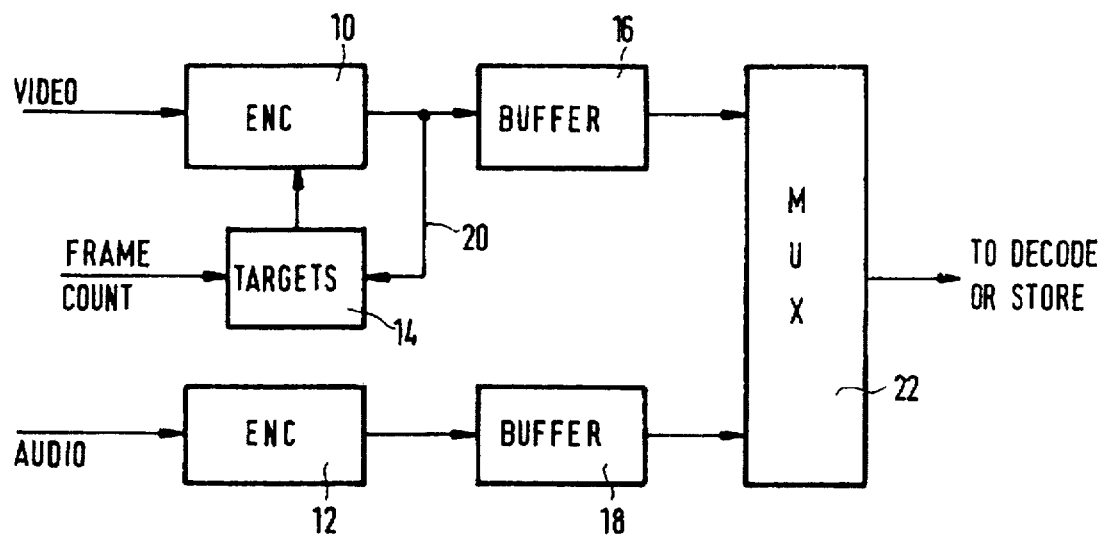
FIGS. 8 and 9 schematically represent encoder and decoder apparatus, respectively.

FIG. 8 shows an encoder apparatus having separate encoder stages 10,12 for video V and audio A signals respectively. A further input for a frame reference signal identifying the frames within the video signal (such as by relative position with respect to the first and last pictures of a sequence) is connected to a target setting stage 14 which specifies the bit allocation for pictures of a sequence. It will be noted that there is no corresponding target stage for the audio encoder: this is not required due to the constant size of the encoded audio frames as described above.

The output from each of the encoder stages 10,12 is shown as being passed to respective buffers 16,18 (although in practise these will form part of the encoder stages). A feedback path 20 from the output of the video encoder stage 10 to the target setting unit 14 enables checking of whether the set targets have resulted in the required number of bits per picture in the encoded group.

The buffered outputs are interleaved by a multiplexer 22 (which also inserts the time stamps) to form a single data stream DS (the system stream) which may then be transmitted to a decoder or stored on a suitable medium, such as a compact disc.

Figure 9:
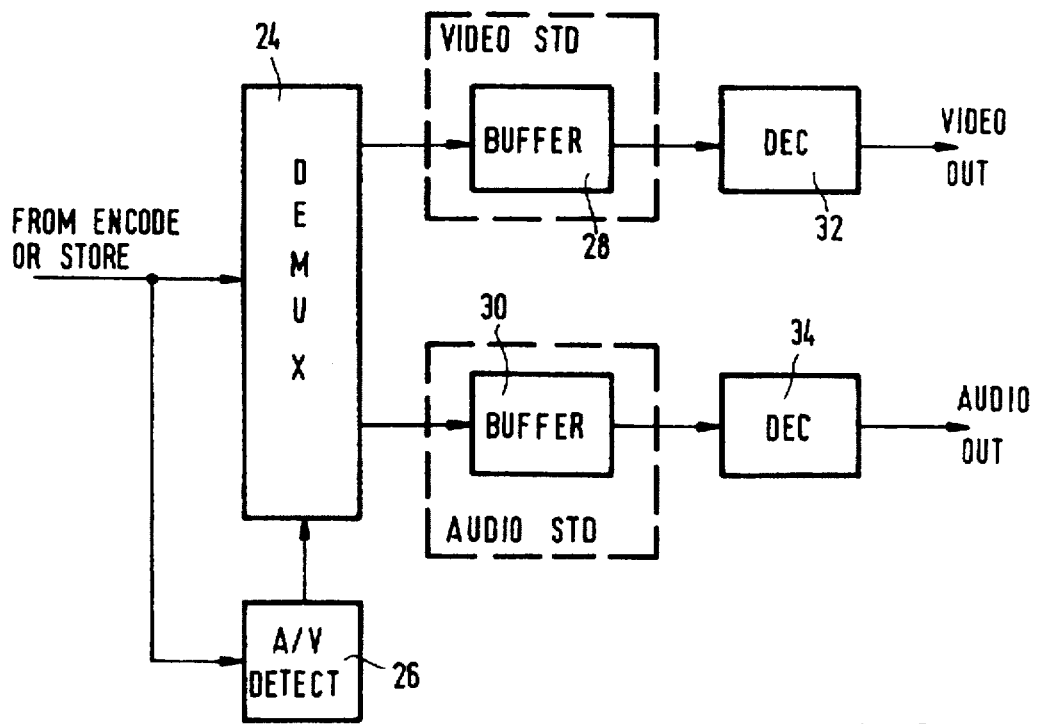

At the decoder (FIG. 9), a demultiplexer 24 separates the stream DS into video and audio channels by reference to a detector 26 monitoring the input stream. The separated video and audio streams are passed to respective buffers 28, 30 and from there to respective decoder stages 32,34 to provide decoded output signals. Whilst the buffers would in practise form part of the respective decoder stages, they are shown separate to illustrate more clearly the STD model.

Because the multiplexer interleaves different streams, the whole DSM bandwidth is not available to any one particular stream. Accordingly, the time taken for the buffer state to reach $B_t$ bits will increase as the number of streams increases. This is a potential problem that can lead to the above-mentioned phenomenon of SCR overlap. SCR overlap manifests itself as follows: when a delta value (estimated duration value) is applied to the SCRs at the start of the next clip, it is found that they are less than the SCRs at the end of the last clip. In other words, the data for the next clip should have been delivered before all the data of the current clip has been delivered. This is clearly an impossible situation and will lead to a system crash.

The multiplexer can guard against SCR overlap by checking each stream to make sure that the time between the first delivery of data and the delivery of the packet that will make up the buffer to $B_t$ bits is not less than $t_r$ seconds (see FIG. 1). If the multiplexer finds that the time $t_r$ is exceeded it knows SCR overlap may occur: in a monitored system, a suitable error message may be presented to the user.

SCR overlap could occur if the sum of the bit rates of the elementary streams is more than the bit rate of the DSM. In this case however, multiplexing is impossible anyway and the multiplexer should exit, again with suitable error message.

SCR overlap may also occur if the multiplexer's basic algorithm for setting the SCRs at the point when $B_t$ has been reached is wrong, or the multiplexer interprets $B_t$ incorrectly.

With increasing fill time, as the number of streams increases, a decrease in the start SCR of the multiplexed clip will result, since delivery must start earlier. Therefore, when a delta value is applied to the start SCR it may be so small as to produce SCR overlap.

The bit rates and STD buffer sizes differ across streams, therefore the times at which all the data has been delivered from the DSM to the STD will be different. For instance, the audio STD buffer is so small in the CSPS case that delivery to it approaches real time. That means that when audio and video streams of similar lengths are multiplexed together audio packs extend past the end of the last video pack so increasing the last SCR. This leads to problems occurring at both ends of the multiplexed stream as the number of streams increases, namely the start SCR decreases and the end SCR increases.

At the end of the multiplexing operation the multiplexer can check for possible SCR overlap as follows: since the multiplexer knows, by examining the input streams, what the delta value for the clip should be it can apply this value to the first SCR of the clip, analogous to the clip having been looped on to itself. The multiplexer also knows what the smallest next possible SCR after the clip would be. A comparison between the patched SCR (the first SCR plus the delta value) and the next possible SCR is carried out. If the patched SCR is found to be less than the next possible SCR, SCR overlap has occurred.

Figure 10:
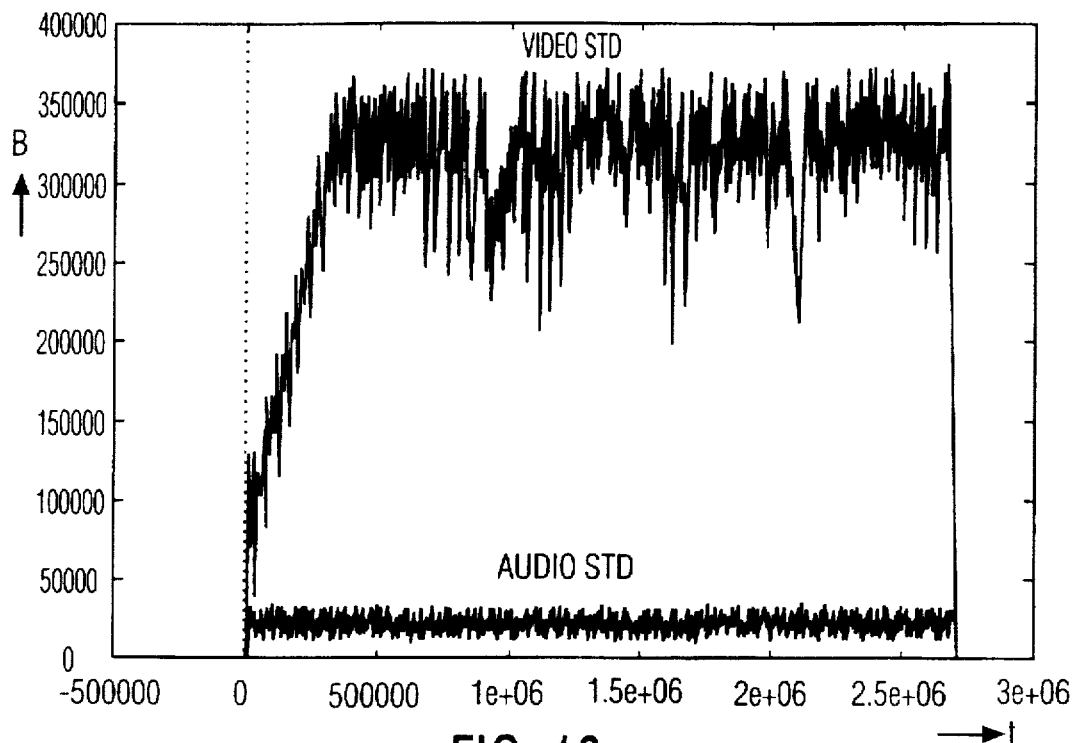
FIG. 10 shows MPEG STD state curves for an audio/video targeted multiplexed pair.

The combination of audio and video to produce seamless system layer clips will now be described with reference to FIG. 10 which shows STD state curves for an audio/video targeted multiplexed pair. The reader will note the different natures of the STD graphs for the two types of stream. The video STD graph is very irregular reflecting changes in picture size as a result of a change of picture type (for instance I pictures are bigger than B pictures) or a change in picture complexity. On the other hand the audio STD graph is very regular reflecting the fact that all audio frames are a constant size (to within one byte).

Figure 11:
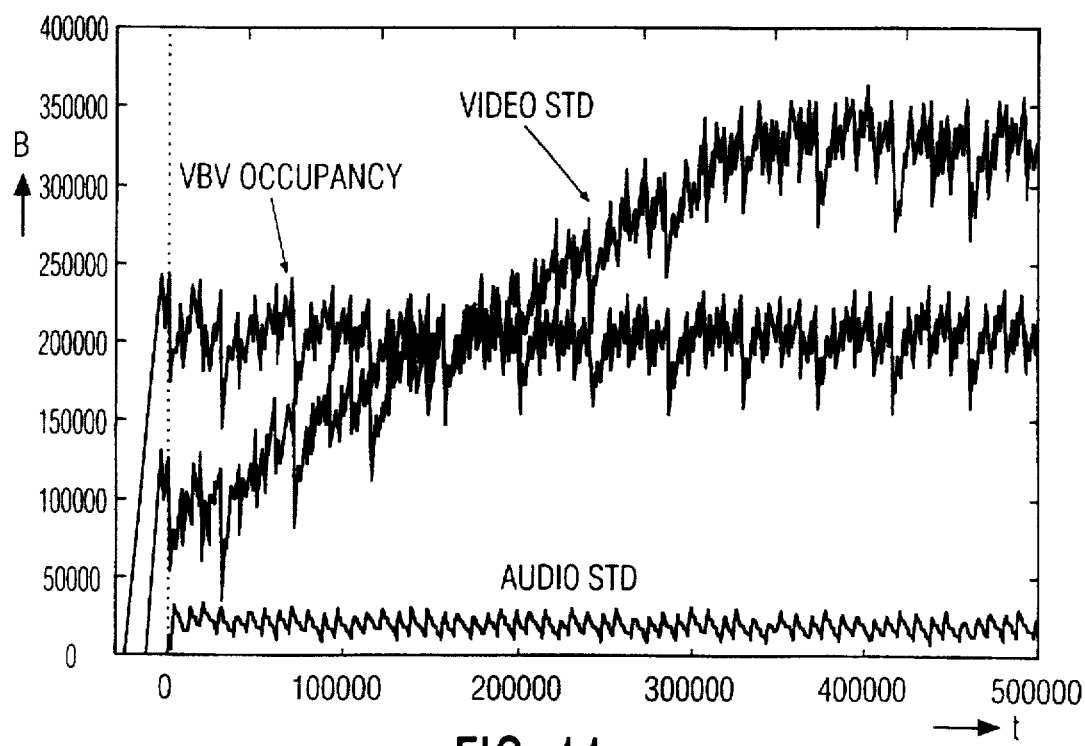
FIG. 11 shows starting states for MPEG VBV and audio and video STD buffer occupancies.

In FIG. 11 curves are shown for the video STD state, its corresponding VBV state and the audio STD state. It will be obvious that the video STD state does not in this instance reach the targeted VBV state at the point when the first picture is removed from the buffer. This occurs because the multiplexer has worked out that to do so would give SCR overlap. That is, if the fill time had been increased to get the STD start state to that of the VBV, the SCRs at the start of the clip would have been too small.

The multiplexer works out the maximum fill time by trying to predict what the last SCR of the whole clip will be and finding how negative the start SCR can go before the SCR overlap occurs. That is to say, how negative the start SCR can be before applying the delta value to it will give an SCR less than that at the end of the clip.

The final SCR is predicted by working out how long, in time, each stream lasts and subtracting from that the amount of data (represented as time) that can be buffered in the STD. The time represented by the data buffered in the STD is just the STD size divided by the elementary stream bit rate. As will be appreciated, for audio it is possible to make a more accurate prediction for buffer time since the size of an audio frame is known, as is the fact that the buffer must contain an integer number of frames. This of course does not apply to video because of the frame size variations.

The final SCR is worked out for each stream and the largest is used. In practice, if the audio and video streams are the same length, the largest last SCR will nearly always be from the audio stream. That may change in the unlikely case of the video data rate approaching the audio data rate.

There is a potential problem with allowing the multiplexer to produce a start STD state that does not reach the start VBV state in that a very large picture in the stream before the STD state overtakes the VBV state may produce buffer underflow. Whilst this is unlikely in practise, it is theoretically possible: a way of overcoming this problem would be to constrain the size of pictures that the encoder produces at the start of a clip.

It should be pointed out here that, although the method described above provides reasonable accuracy in estimation of what the last SCR of a clip would be, it may not always be sufficiently accurate, depending on the particular application. Inaccuracies may arise because there are things that effect the pack allocation through a multiplexing operation that can only be discovered once the multiplexer has run through the clip. For this reason, the user requiring accuracy should run the multiplexer twice, the second time modifying some parameters (for instance shortening the audio or reducing the targets) to get non-overlapping SCRs. A method of automating production of valid clips would be a two pass approach, first using the best guess method described above and a second time taking into account any modifications that may have to be made based on the results of the first pass.

Figure 12:
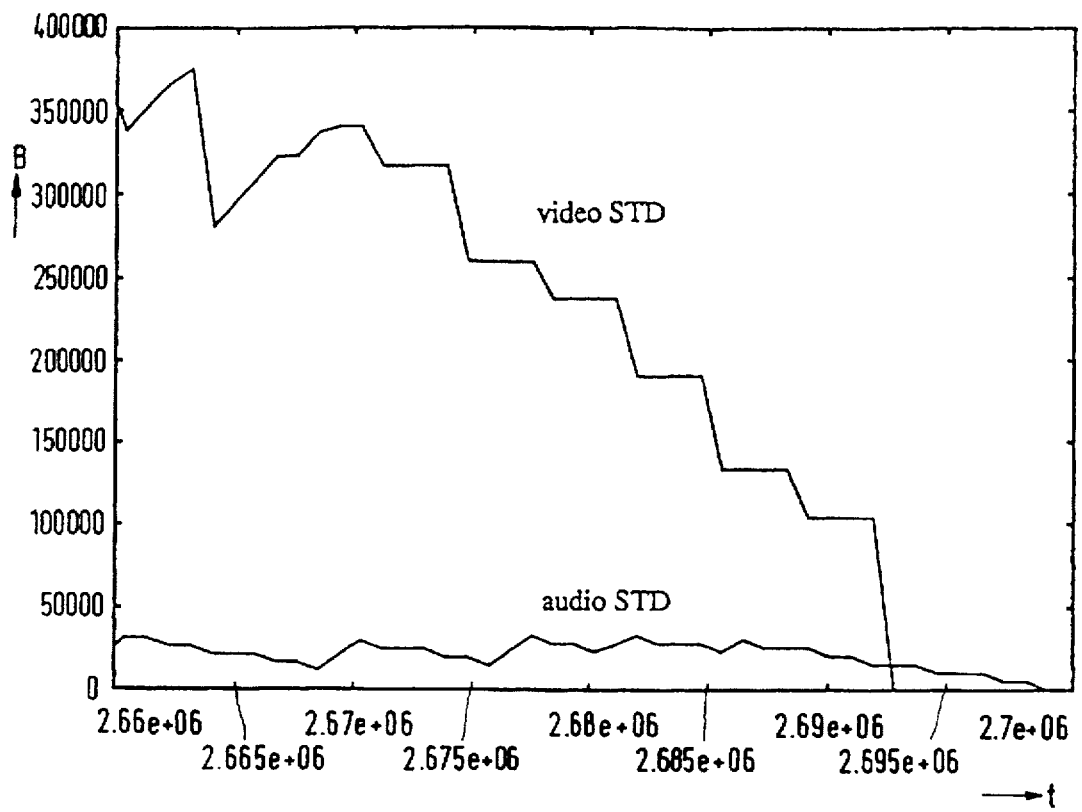
FIG. 12 represents end states for the audio and video STD buffer occupancies of FIG. 11.

Referring now to FIG. 12, which shows the audio and video STD states at the end of a clip, it will be noted that delivery of data to the audio STD extends past the end of delivery to the video STD. Therefore, audio is the stream that controls the end SCR. As stated previously, the multiplexer can try to reduce the last SCR by delivering the data to the STD as soon as possible. A suitable technique for this would be to make packets that are smaller than optimum at the end of the multiplexing operation.

Turning now to time stamps, the only time stamp the multiplexer has any control over is the SCR which is the time at which a pack is delivered. The other time stamps (PTS and DTS) are set when the user decides what the PTS of the first frame should be. In order for clips produced by the above method to appear seamless to a decoder, the time stamps must appear to increase linearly, that is to say there must not be a sudden step change in the time stamps which the decoder sees. This is achieved by applying a delta value to all the time stamps in the next clip so they have the values that would have appeared if the current clip had been longer.

The delta value has to be applied before the decoder sees the data. This value may be applied, for example, in:

the application before it sends the clip to the decoder;

the driver that sends the clip to the decoder;

the CPU of a remote server before the video data is sent down the phone line to a set-top box.

A delta value is the difference between the PTS of the frame after the last frame of the current clip (had it been present) and the PTS of the first frame of the next clip, summarised by the equation:

$$\Delta = PTS_{last} + PTS_{step} - PTS_{first} \qquad (2)$$

Where:

$PTS_{last}$ is the PTS of the last frame of the current clip $PTS_{step}$ is the increase in adjacent PTSs $PTS_{first}$ is the PTS of the first frame of the next clip.

If it is desired to play seamless clips of MPEG audio and video synchronised with each other, there can only be one delta value applied to the time stamps of both data types. This is due to the fact that time, which in the MPEG system layer is represented by the SCR, is increasing at the same rate for both types of data stream. If the delta values were different we would lose synchronisation as the time stamps drift farther apart. The question is discussed below of how the delta value should be worked out since the frame period, and hence $PTS_{step}$ above, for audio and video is different.

The reader will be familiar with the term "frame rate" when applied to video: it is 25 Hz for PAL and 29.97 Hz for NTSC, for example. MPEG coded audio however is also split up into frames consisting of 384 samples for layer I and 1152 samples for layers II and III. These form independent blocks of data which, when put together, make up an MPEG audio stream. In order for a decoder to produce the desired output, it has to receive an integer number of frames: sending half a frame of audio will cause glitches, or possibly even a system crash. This presents a problem because, for any clip of MPEG, the time covered by the audio and video frames contained within it will usually be different. Considering FIG. 13 which shows a 5 second piece of video and audio, the reason for the difference will become apparent.

Figure 13:
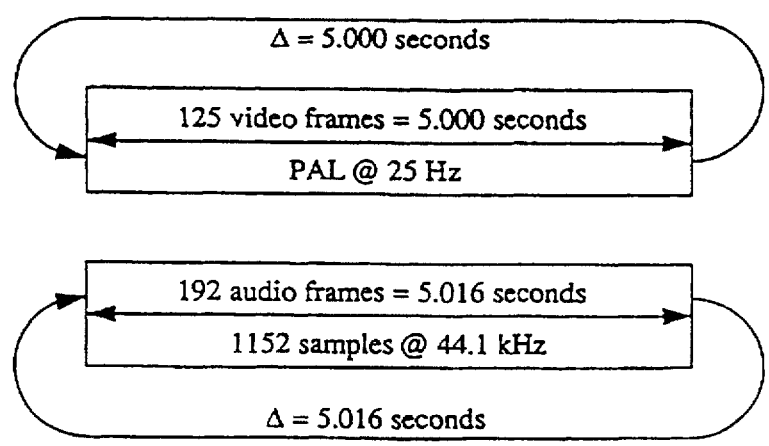
FIG. 13 illustrates differences in time values between audio and video frames.

FIG. 13 shows two blocks representing an integer number of audio and video frames. The number of frames within each block is such that the time for the block is as near as possible to 5 seconds. In order to minimise the difference between the audio and video timing, the multiplexer is suitably configured such as to be able to select individual stream sections, that is to say not be constrained to take complete audio or video files. In this way the respective starts and finishes may be chosen such as to minimise the overall difference between the audio and video clip lengths.

By way of example we now consider what would happen if the data of FIG. 13 were contained within a system file that it was wished to loop, with the delta value worked out from the video or the audio.

Taking the video delta value first, applying the video delta value to the video data results in an even video frame rate during the loop. However, if this delta value (5.0 seconds) was used on the audio block time stamps would be patched at the start of the loop to the same as they are at the end. This clearly would not work and leads to a need to reduce the number of audio frames to 191 giving:

$$\frac{191 \times 1152}{44100} = 4.989 \text{ seconds}$$

However, having patched the time stamps at the start of the audio to be 5.0 seconds ahead of what they are at the end gives an error of 10.6 ms, which is 40.6% of an audio frame. This discrepancy will lead to the audio being muted from the end to the start of the loop for 10.6 ms.

Turning now to the audio delta value, by using this, the audio frame rate is preserved. However, there is a difference of 15.5 ms between what the patched time stamps for video are and what they would be if the frame rate was constant, which is 38.8% of a video frame. This difference manifests itself in a freezing of the last frame of the clip for 15.5 ms. However, the frame will still be on the screen.

The above demonstrates that there is no perfect solution to the problem of different frame lengths: either an audio mute or a frozen video frame will result although the duration of the freeze may be minimised by taking elementary stream sections, rather than whole files, as described above. Of the two, the frozen video frame is preferable since the user will hardly notice it compared to an audio mute which is very obvious. For this reason, it is suggested that audio be used as the driving data type for delta values when trying to loop synchronised audio and video.

From reading the present disclosure, other variations will be apparent to persons skilled in the art. Such variations may involve other features which are already known in the methods and apparatuses for editing of audio and/or video signals and component parts thereof and which may be used instead of or in addition to features already described herein. Although claims have been formulated in this application to particular combinations of features, it should be understood that the scope of the disclosure of the present application also includes any novel feature or any novel combination of features disclosed herein either implicitly or explicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method for encoding of digital video signals, in the form of segments each comprising two or more video frames, and in an encoder apparatus having a coding stage, an encoder buffer, and means for interleaving the encoded video signal with at least one further signal to form a system stream, the method comprising, for each segment, the steps of:

successively encoding the frames of the segment according to a predetermined coding scheme;

reading the encoded frames into the buffer;

reading the encoded segment out of the buffer at a substantially constant bit rate; and interleaving the buffer output signal into a system stream together with one or more time stamps;

characterised in that the encoder buffer occupancy is controlled to have a first predetermined level at the moment the last frame of a preceding segment has been read into it, which occupancy level is related to a decoder buffer occupancy level, and in that the method comprises the further steps of:

deriving the time t required to fill a decoder buffer from empty to the said decoder buffer occupancy level at the constant bit rate;

predicting a duration delta for a current segment;

predicting a time value for the point at which the last frame of the current segment is to be read out of the decoder buffer;

reducing the value of t until the time value given by (t+delta) is close to but greater than the said time value at which the last frame of the current segment is to be read out of the decoder buffer; and inserting a time stamp into the system stream of the segment indicating that the first frame of that segment is to be read out of the decoder buffer at the time given by the reduced value of t after loading of the segment commenced.

2. A method as claimed in claim 1, in which the time value for the point at which the last frame of the current segment is to be read out of the decoder buffer is predicted by calculating the duration of the segment and subtracting from that the decoder buffer maximum capacity in terms of time.

3. A method as claimed in claim 1, in which the time value for the point at which the last frame of the current segment is to be read out of the decoder buffer is predicted for each stream interleaved, and the greatest value is used in the derivation of the reduced value of t for all streams.

4. A method as claimed in claim 1, in which a target number of bits used to encode pictures of the first segment is controllably varied to reach the said encoder buffer occupancy level.

5. A method as claimed in claim 1, wherein a maximum encoder buffer occupancy level is specified, and the decoder buffer occupancy level is defined as the difference between the said maximum level and the encoder buffer occupancy level one frame period after the last picture of the first segment has been read into the encoder buffer.

6. A digital video image signal comprising a plurality of segments encoded by a method according to claim 1, the signal comprising a stream of encoded segments interleaved with at least one further signal into a system stream, the system stream including for each segment the said time stamp indicating that the first frame of the respective segment is to be read out of a decoder buffer at a time given by the reduced value of t after loading of the segment into the encoder buffer commenced.

7. An optical disc carrying a video image signal as claimed in claim 6.

8. A digital video signal encoder apparatus, configured for the encoding of image segments, where each segment comprises two or more video frames, the apparatus comprising:

an encoding stage arranged to receive successive frames of a segment and encode them according to a predetermined coding scheme;

a buffer coupled to receive successive encoded frames from the encoding stage and arranged to output encoded segments at a substantially constant bit rate; and a multiplexer coupled to receive the buffer output and at least one further signal and arranged to interleave them into a system stream;

characterised in that the encoding stage is operable to encode images of a segment in a controllably variable number of bits, to produce a predetermined encoder buffer occupancy at the moment the last image of a segment is read into the encoder buffer, to generate predicted values for the segment duration and time value for the point at which the last frame of the segment is to be read out of a decoder buffer, and to determine a time value on the basis thereof, and said multiplexer is arranged to insert a time stamp into the system stream of the segment indicating that the first frame of that segment is to be read out of the decoder buffer said determined time value after loading of the segment into the decoder buffer commenced.

9. Apparatus as claimed in claim 8, comprising a further encoding stage arranged to receive successive data frames and encode them according to said predetermined coding scheme, and a further buffer coupled to receive successive encoded data frames from said further encoding stage and arranged to output encoded data at a substantially constant bit rate, wherein said at least one further signal received by the multiplexer is the output from the further buffer.

* * * * *